United States Patent
Eslambolchi et al.

(10) Patent No.: US 6,179,278 B1
(45) Date of Patent: Jan. 30, 2001

(54) WORK STATION FOR FIBER OPTIC CABLE SPLICING

(75) Inventors: Hossein Eslambolchi, Basking Ridge, NJ (US); John Sinclair Huffman, Conyers, GA (US)

(73) Assignee: AT&T Corp., New York, NY (US)

( * ) Notice: Under 35 U.S.C. 154(b), the term of this patent shall be extended for 0 days.

(21) Appl. No.: 09/444,107

(22) Filed: Nov. 22, 1999

(51) Int. Cl.[7] ..................................................... B25B 1/24
(52) U.S. Cl. .......................... 269/43; 269/903; 144/286.1
(58) Field of Search ..................... 269/43, 45, DIG. 903, 269/293; 144/286.1, 286.5

(56) References Cited

U.S. PATENT DOCUMENTS

| | | | |
|---|---|---|---|
| 4,143,601 | * | 3/1979 | Pike ........................................ 108/35 |
| 4,177,737 | * | 12/1979 | Brickman ................................ 108/11 |
| 4,191,111 | * | 3/1980 | Emmert ................................. 108/132 |
| 4,281,570 | * | 8/1981 | Hill ....................................... 83/477.2 |
| 4,335,765 | * | 6/1982 | Murphy ............................. 144/286 R |
| 4,350,193 | * | 9/1982 | McCambridge et al. ......... 144/286 R |
| 4,489,830 | * | 12/1984 | Charlesbois et al. ................. 206/316 |
| 4,588,176 | * | 5/1986 | Anderton ............................... 269/16 |
| 4,989,654 | * | 2/1991 | Berkeley ........................... 144/286 A |
| 5,189,725 | | 2/1993 | Bensel, III et al. . |
| 5,882,155 | * | 3/1999 | Testa, Jr. ............................... 409/132 |

* cited by examiner

*Primary Examiner*—David A. Scherbel
*Assistant Examiner*—Hadi Shakeri

(57) ABSTRACT

A work station for splicing together a pair of fiber optic cables includes a portable splicing table including a recessed portion for supporting a splice enclosure. The recessed portion extends across the width of the splicing table and allows for a pair of fiber optic cables to enter the table in the recessed portion. A pair of cable grips are included in the recessed area for holding the cables in place during the splicing operation. A plurality of fiber clips may be disposed on the table surface and used to match up the pairs of fibers to be spliced together from the cables.

9 Claims, 1 Drawing Sheet

WORK STATION FOR FIBER OPTIC CABLE SPLICING

TECHNICAL FIELD

The present invention relates to a work station for use in fiber optic cable splicing and, more particularly, to a work station that is portable and suitable for use with various types of fiber optic cables in many diverse environments.

BACKGROUND OF THE INVENTION

The use of communication cables which include a plurality of optical fibers is rapidly expanding. A fiber optic cable comprises a plurality of glass fibers, each of which is protected by at least one layer of a coating material. The optical fibers are assembled into units in which the fibers are held together by binder ribbons to provide a core. In one manufacturer's line of cables, the core is enclosed by a plastic tube and a plastic jacket.

During the service life of an optical fiber cable, the cable may become damaged. This may occur, for example, through unintentional contact by various kinds of excavation equipment, by lightning or by animal attacks. Such damage may be partial, in which case one or more optical fibers may be interrupted, or the damage may be total, such as a complete cable cut, for example.

In any case, it becomes necessary to restore service as quickly as possible. This may be done through splicing a repair fiber between "cleaned" ends of the damaged cable. The splicing may be done through an expedited temporary arrangement (i.e., a field splicing arrangement) while more work is under way to replace the damaged cable with an equivalent or enhanced system. A "field splicing" arrangement must be one which is easily installed and which is low in cost. Elements of the arrangement must be capable of being packaged quickly and efficiently, and should allow a repair technician to work in an efficient manner to prepare high quality splices.

Indeed, restoration splicing is known to be a very tedious task. It requires steady hands and a clean work environment to achieve high quality splices. Prior studies in assessing the quality of fiber splices have shown that if the technician is under stress, the splices may not be performed correctly and may need repeating multiple times to achieve an acceptable signal quality through the splice region.

A need remains, therefore, for a fiber splicing arrangement that will allow the technician to organize the work area and have a standard setup for splicing together fiber optic cables.

SUMMARY OF THE INVENTION

The need remaining in the prior art is addressed by the present invention, which provides a splicing station for use in fiber optic cable splicing and, more particularly, to a splicing station that is portable and suitable for use with various types of fiber optic cables in many diverse environments.

In accordance with the present invention, a fiber optic splicing station comprises a portable table including a flat top surface for supporting test equipment and the tools required to performing splicing operations. A recessed area is included in the table top for supporting the splice enclosure itself in an "out of the way", yet accessible, position. A set of cable grips are disposed within the recessed area and used to hold the fiber cable in place during the splicing process. Advantageously, the grips may be of different sizes so as to adequately secure cables of different diameters. A number of fiber-holding clips are disposed on the surface of the table and used to layout and organize the various pairs of individual fibers to be spliced together.

Other and further advantages of the splicing station of the present invention will become apparent during the course of the following discussion and by reference to the accompanying drawings.

BRIEF DESCRIPTION OF THE DRAWINGS

Referring now to the drawing, the sole FIGURE illustrates a fiber splicing work station formed in accordance with the present invention.

DETAILED DESCRIPTION

Figure 1:
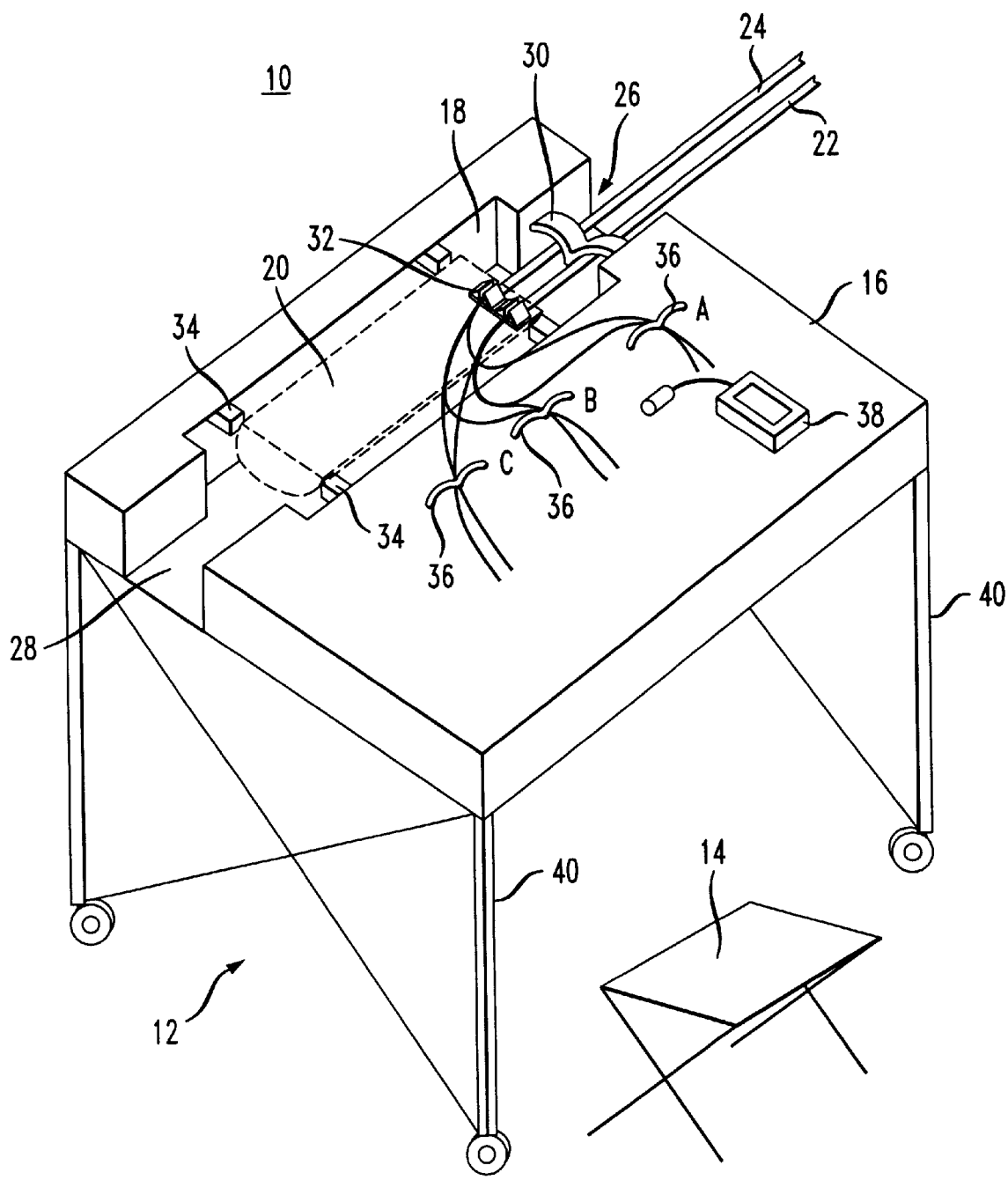

An exemplary fiber optic cable splicing work station 10, formed in accordance with the present invention, is illustrated in the FIGURE. Workstation 10 comprises a portable table 12 and, optionally, an associated collapsible stool 14. The stool 14 allows a technician performing the splicing operation to sit and be comfortable as he/she works. In accordance with the present invention, portable table 12 includes a flat working surface 16 and a recessed area 18, sized to accept a conventional splice enclosure 20, illustrated in phantom in the FIGURE. A pair of fiber cables 22, 24 which are to be joined via splicing, are shown as entering recessed area 18 via an end opening 26. A similar opening 28 is included at the opposite end of recessed area 18, if the technician desired to have the cables enter in a "left-handed" arrangement.

In accordance with the present invention, fiber cable grips 30, 32 are included in splicing work station 10 to hold cables 22, 24 in place during the splicing process. Referring to the FIGURE, cable grips 30 are located in opening 26 of recessed area 18 and are sized to accommodate a relatively large pair of fiber optic cables. A second set of cable grips 32 are disposed within recessed area 18 and are sized to hold in place a pair of cables having a smaller outer diameter. For the illustrated embodiment, cables 22, 24 are held in place by cable grips 32. To prevent movement of splice enclosure 20 during the splicing process, splicing work station 10 includes a set of adjustable locking pins 34 disposed as shown. In an exemplary embodiment, locking pins 34 comprise threaded members, threaded in station 10 inside of openings 26 and 28, and may be adjusted to come into contact with the outer surface of enclosure 20 and fix it in place.

Once the outer sheathing material on each cable 22, 24 has been removed, the separate optical fibers within the cables are spliced together to form the repaired cable. That is, separate optical fibers from first cable 22 are spliced (in a one-to-one relationship) to separate optical fibers from second cable 24. In order to separate the fibers into pairs and keep track of which pairs have been spliced together, a plurality of fiber clips 36 are included on work surface 16 of portable table 12. An exemplary fiber clip may comprise a metallic piece-part of an inverted "W" geometry, with a sufficient spring tension to keep the fibers in place without imparting any stress-induced damage to the individual fibers. In the exemplary embodiment of the present invention as illustrated in the FIGURE, a set of three such fiber clips 36A, 36B and 36C are shown. It is to be understood that this is simply one embodiment, and that any suitable number of fiber clips may be used with the work station arrangement of the present invention. In preparing the individual fibers to be spliced, a first fiber A from cable 22 is held in a first clip $36_A$ with a first fiber A from cable 22. A second fiber B from cable 22 is held in a second clip $36_B$ with a second fiber B from cable 24, and—likewise—a pair of fibers (denoted C) from each of cables 22 and 24 are held within a third clip $36_C$. A splicing tool 38 is then used to join (e.g., using fusion splicing, for example) the endfaces of the fibers together to form a spliced fiber section.

Once all of the splices have been completed, the fibers are then fixed within enclosure 20 in any suitable fashion (various splice enclosures, well known in the art, utilize different arrangements for holding the spliced sections in a fixed manner). A splice enclosure lid (not shown) may then be attached to enclosure 20 and locking pins 34 loosened sufficiently to allow for enclosure 20 to be removed from work station 10. In a preferred embodiment, legs 40 of table 12 are collapsible, allowing for table 12 to be folded (including stool 14, if used) and therefore easily carried from the splice location back to the technician's vehicle.

It is to be understood that the above-described arrangement of the splicing work station of the present invention is simply illustrative of the inventive concepts. Other arrangements may be devices by those skilled in the art which will embody the principles of the invention and fall within the spirit and scope thereof.

What is claimed is:

1. A work station for affecting a splicing procedure between a pair of fiber optic cables, the work station comprising a splicing table including a plurality of legs supporting the splicing table at a predetermined height, the table including a relatively flat working surface;

a recessed area formed in the splicing table relatively flat working surface, said recessed area exhibiting a depth and length sized to support a fiber optic splice enclosure so as to maintain said enclosure essentially coextensive with said relatively flat working surface;

at least one end opening terminating in said recessed area, said at least one end opening located along a side edge of said splicing table to allow a pair of fiber optic cables to enter and be supported by the working surface at least one pair of fiber optic cable grips, disposed in said at least one end opening, for clamping a pair of fiber optic cables in place during a splicing operation; and a plurality of fiber clips disposed on the relatively flat working surface, a separate one of each clips for holding a pair of optical fibers to be spliced together.

2. A work station as defined in claim 1 wherein the plurality of legs are collapsible.

3. A work station as defined in claim 1 wherein the at least one end opening termination comprises a pair of end openings, disposed at either end of the recessed area and aligned with opposing side edges of the splicing table.

4. A work station as defined in claim 1 wherein the station further comprises a set of locking pins extending into the interior portion of said recessed area for engaging with a supported splice enclosure and fixing said splice enclosure in place during a splicing operation.

5. A work station as defined in claim 4 wherein the set of locking pins comprise a set of threaded members that may be threaded into and out of the splicing table to fix the splice enclosure in place.

6. A work station as defined in claim 1 wherein the at least one pair of fiber optic cable grips comprises a pair of cable grips that are adjustable to clamp cables of various outer dimensions.

7. A work station as defined in claim 1 wherein the at least one pair of fiber optic cable grips comprises a plurality of pairs of cable grips, each pair of a different size so as to clamp a pair of cables of different diameters.

8. A work station as defined in claim 1 wherein the station further includes a stool for use with the splicing table.

9. A work station as defined in claim 8 wherein the stool is collapsible.

* * * * *